US00RE34581E

United States Patent [19]

Sofy et al.

[11] E Patent Number: Re. 34,581

[45] Reissued Date of Patent: Apr. 12, 1994

[54] PUNCH PRESS TRANSFER MECHANISM

[75] Inventors: Hugh M. Sofy, 201 Warrington, Bloomfield Hills, Mich. 48013; Dennis P. Farhat, Rochester Hills, Mich.

[73] Assignee: Hugh M. Sofy, Bloomfield Hills, Mich.

[21] Appl. No.: 879,023

[22] Filed: May 6, 1992

Related U.S. Patent Documents

Reissue of:

[64] Patent No.: 4,833,908
Issued: May 30, 1989
Appl. No.: 140,479
Filed: Jan. 4, 1988

[51] Int. Cl.[5] ..... B21J 13/08

[52] U.S. Cl. ..... 72/405; 198/621

[58] Field of Search ..... 72/405, 421; 198/621, 198/774

[56] References Cited

U.S. PATENT DOCUMENTS

| | | | |
|---|---|---|---|
| 4,361,413 | 11/1982 | Toda | 72/405 |
| 4,393,682 | 7/1983 | Imanishi | 72/405 |
| 4,397,174 | 8/1983 | Jungesjo | 198/774 |
| 4,407,404 | 10/1983 | Rise | 198/774 |
| 4,407,405 | 10/1983 | Rise | 198/774 |
| 4,513,602 | 4/1985 | Sofy | 72/405 |
| 4,630,461 | 12/1986 | Votava | 72/405 |

FOREIGN PATENT DOCUMENTS

| | | | |
|---|---|---|---|
| 136775 | 11/1978 | Japan | 72/405 |
| 178137 | 10/1984 | Japan | 722/405 |
| 197335 | 8/1990 | Japan | 72/405 |

*Primary Examiner*—Daniel C. Crane
*Attorney, Agent, or Firm*—Reising, Ethington, Barnard, Perry & Milton

[57] ABSTRACT

A workpiece (W) transfer assembly (10) is provided for a progressive die type punch press. The assembly (10) includes a first crank bar (28) driven to oscillate about a first rock shaft (24) by the press ram, and a second crank bar (36) driven to oscillate about a second rock shaft (32) by the press ram. A horizontal linkage (40) extends between the first crank bar (28) and a workpiece engaging jaw (18). A vertical linkage (42) extends between the second crank bar (36) and the horizontal linkage (40). A linear bearing (48) interconnects the vertical linkage (42) and the horizontal linkage (40). A plate (44) having a vertically elongated slot (46) disposed therein is attached to the horizontal linkage (40). The first crank bar (28) extends through the slot [(48)] (46) and thereby imparts motion to the jaw (18). The combination of elements allow horizontal jaw (18) movement into and out of engagement with the workpieces (W), and lost motion transmission in the vertical direction for raising and lowering the jaw (18) relative to the stations.

25 Claims, 3 Drawing Sheets

PUNCH PRESS TRANSFER MECHANISM

Matter enclosed in heavy brackets [ ] appears in the original patent but forms no part of this reissue specification; matter printed in italics indicates the additions made by reissue.

TECHNICAL FIELD

This invention relates generally to assemblies used to transfer workpieces through a machine having a reciprocating member. More particularly, the invention relates to an assembly which is driven by the ram of a punch press for engaging the workpieces to move them progressively from one die station to another so that a plurality of sequential operations may be performed on them.

BACKGROUND ART

Workpiece transfer assemblies for use in progressive die type punch presses are well known in the art. Examples of these are shown in U.S. Pat. Nos. 3,138,128 granted June 23, 1964, 3,421,637 granted Jan. 14, 1969, 4,198,845 granted Apr. 22, 1980, and 4,513,602 granted Apr. 30, 1985, all in the name of the inventor of the subject invention.

A common problem not effectively eliminated by the prior art technology rises when the workpieces are lifted above the surface of the die before they are moved to the next station, either because of workpiece shape on the nature of the forming operation. In the past, this lift and carry operation was preformed by complex rack and pinion assemblies, as shown in the U.S. Pat. No. 4,436,199 to Baba et al granted Mar. 13, 1984, or by devices that were bolted onto the workpiece engaging jaws, as shown in my U.S. Pat. No. 4,198,845. These prior art lifting devices were clumsy, difficult to maintain, and comparatively expensive to produce.

SUMMARY OF THE INVENTION AND ADVANTAGES

The subject invention provides a workpiece transfer assembly for a press of the type including a reciprocating member and a series of in-line stations wherein each station is a further progression of the workpiece forming process. The transfer assembly comprises a first cam and a second cam for actuation by a reciprocating member, a first cam follower actuated by the first cam for driving a workpiece engaging jaw in a horizontal direction into and out of a workpiece engagement position, and a second cam follower means actuated by the second cam for raising and lowering the jaw in a vertical direction relative to the stations. The transfer assembly is characterized by including a motion transmitting means disposed between the jaw and the first and second cam follower means which provides positive motion transmission to the jaw for horizontal movement into and out of engagement with the workpieces, and provides lost motion transmission in the vertical direction to allow the jaw to be raised and lowered relative to the stations while the first cam follower means remains in the workpiece engagement position.

The subject invention provides a sturdy operating design which is inexpensive to manufacture, readily adaptable to die changes in the press, and easily serviced.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
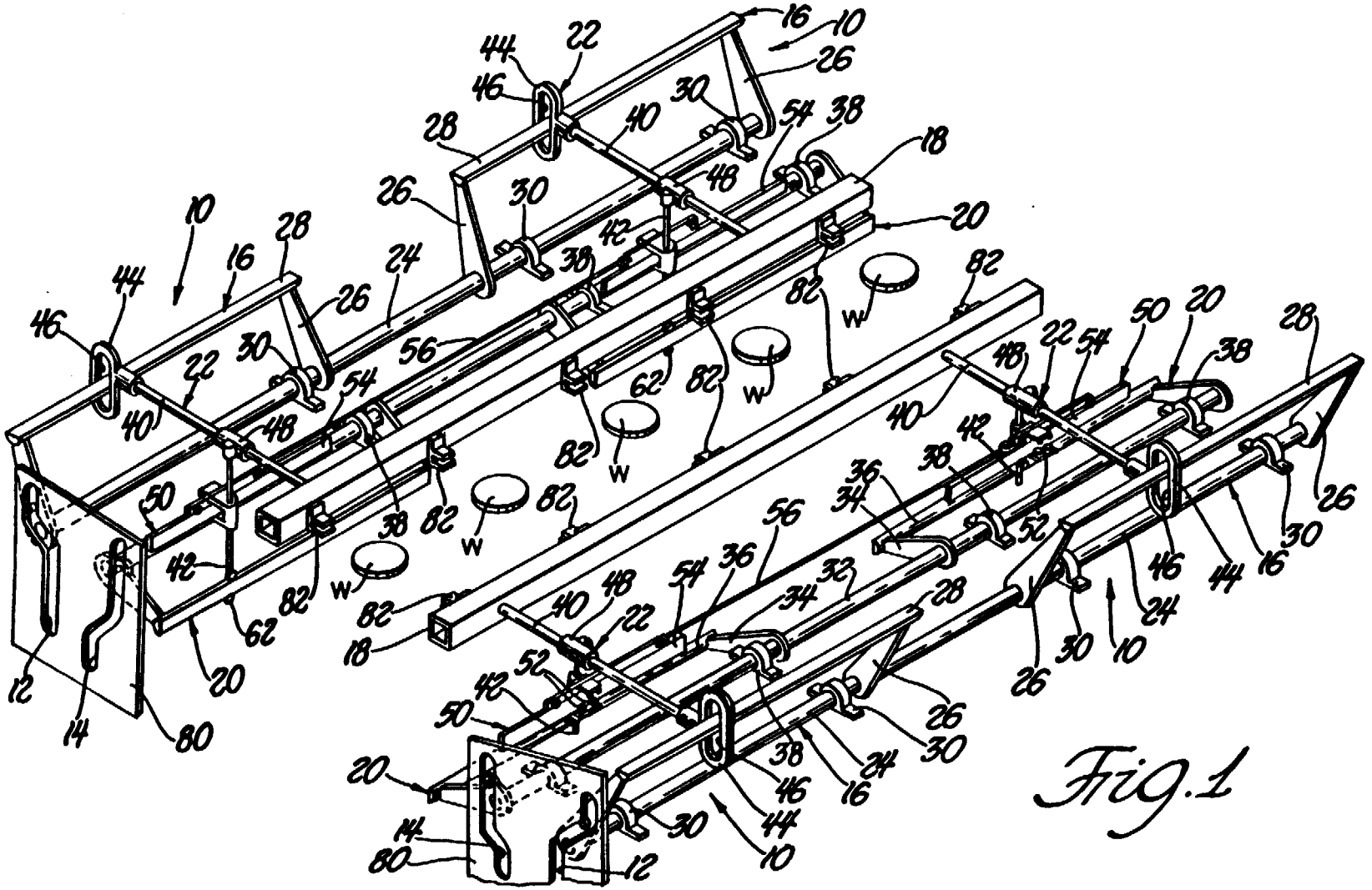
FIG. 1 is a perspective view of the preferred embodiment of the subject invention.

Referring to the figures, wherein like numerals indicate like or corresponding parts throughout the several views, a workpiece transfer assembly is generally shown at 10. The transfer assembly 10 is specifically adapted for operation with a press of the type including a reciprocating member, i.e., ram, and a series of in-line die stations wherein each station is a further progression of the workpiece forming process. For convenience, a plurality of workpieces W are shown in FIG. 1.

The assembly 10 comprises a first cam 12 and a second cam 14 for actuation by the reciprocating member. A first cam follower means, generally indicated at 16, is actuated by the first cam 12 for driving a workpiece engaging jaw 18 in a horizontal direction into and out of a workpiece engagement position (shown in phantom at 100 in FIG. 2). The second cam follower means, generally indicated at 20, is actuated by the second cam 14 for raising and lowering the jaw 18 in a vertical direction relative to the stations.

The transfer assembly 10 is characterized by including motion transmitting means, generally indicated at 22, disposed between the jaw 18 and the first 16 and second 20 cam follower means for providing positive motion transmission to the jaw 18 for horizontal movement into and out of engagement with the workpieces W and for providing lost motion transmission in the vertical direction to allow the jar 18 to be raised and lowered relative to the stations while the first cam follower means 16 remains in the workpiece engagement position.

The first cam follower means 16 comprises a first rock shaft 24, at least one, and preferably two, rocker arms 26 oscilatory about the first rock shaft 24, and a first crank bar 28 disposed on the distil end of the rocker arms 26. The first rock shaft 24 rotates axially in a plurality of fixed bearings 30. Therefore, as the first cam 12 reciprocates with the ram, the first rock shaft 24 is axially rotated within the bearings 30, and the first crank bar 28 oscillates in an arcuate path therewith. The first crank bar 28 engages the motion transmitting means 22, such that oscillation of the first crank bar 28 ultimately moves the jaw 18 horizontally into and out of engagement with the workpieces W, as will be described subsequently.

The second cam follower means 20 comprises a second rock shaft 32, at least one, and preferably two, rocker arms 34 oscillatory about the second rock shaft 32, and a second crank bar 36 disposed on the distil end of the rocker arms 34. The second rock shaft 32 is held [axial] *axially* rotatable within a plurality of strategically placed bearings 38. As the second cam 14 reciprocates with the ram, the second cam follower means 20 is driven to oscillate about the second rock shaft 32, so that the second crank bar 36 also scribes an arcuate path. The second crank bar 36 engages the motion transmitting means 22 such that during the arcuate oscillation of the second crank bar 36, the jaw 18 is raised and lowered relative to the stations.

The motion transmitting means 22 includes a horizontal linkage 40 extending between the jaw 18 and the first crank bar 28 for transferring horizontal motion to the jaw 18 from the first cam follower means 16. The horizontal linkage 40 preferrably comprises an elongated tubular member having a constant circular cross section therealong.

The motion transmitting means 22 also includes a vertical linkage 42 which extends between the second crank bar 36 and the horizontal linkage 40. The vertical linkage 42 transfers vertical motion to the jaw 18 from the second cam follower means 20. That is to say, as the second crank bar 36 is driven to oscillate, it moves the vertical linkage 42 between raised and lowered positions, which in turn moves the horizontal linkage 40 and ultimately the jaw 18. Preferably, the vertical linkage 42 comprises an elongated tubular member having a constant circular cross section therealong.

Figure 2:
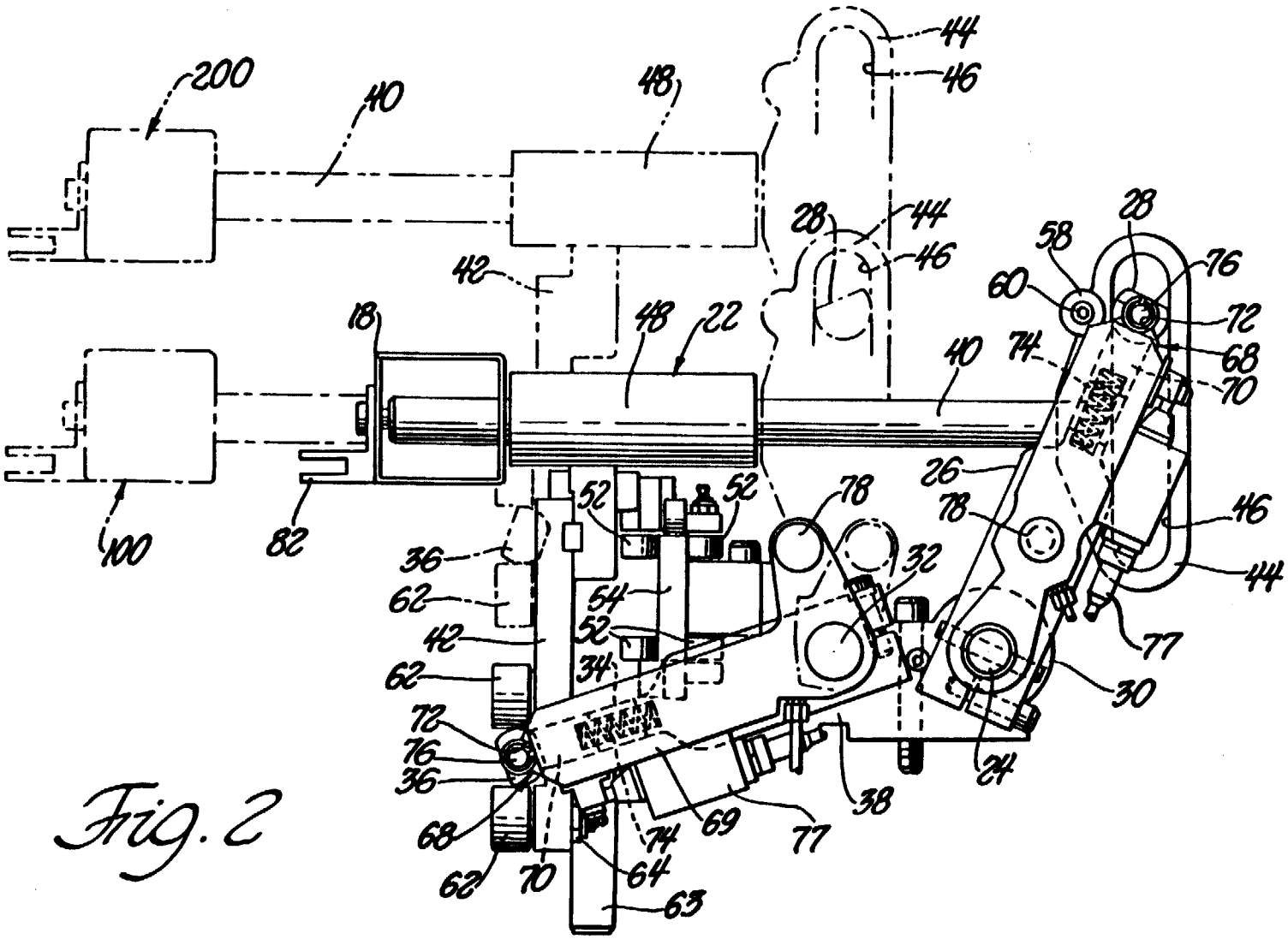
FIG. 2 is an end view of the subject invention shown with cams removed.

The motion transmitting means 22 includes a plate 44 having a vertically elongated slot 46 disposed therein for transmitting positive horizontal motion in response to force applied horizontally to the slot 46 from the first cam follower means 16, and for providing lost vertical motion within the slot 46 to the first cam follower means 16 in response to force applied vertically from the second cam follower means 20. As shown in FIGS. 1 and 2, the plate 44 is disposed on the outermost end of the horizontal linkage 40. The first crank bar 28 extends through the slot 46 so that the during oscillation, the first crank bar 28 moves the horizontal linkage 40 in response to force applied on the inside surfaces of the slot 46, thereby providing positive motion transmission.

In the preferred embodiment, the first rock shaft 24 and the second rock shaft 32 extend in a parallel longitudinal direction relative to the stations. Preferably, the first 24 and second 32 rock shafts are orientated in close proximity to each other, for reasons which will become obvious during later discussion of the first and second cam 12, 14 embodiments.

The motion transmitting means 22 also includes a bearing means 48 interconnecting the horizontal linkage 40 and vertical linkage 42 for allowing the horizontal linkage 40 to be moved relative to the vertical linkage 42. More specifically, the bearing means 48 comprises a linear type bearing 48 fixedly disposed on the vertical linkage 42. The horizontal linkage 40 extends through the bearing 48 for providing guided horizontal motion to the horizontal linkage 40. As shown in the figures, the bearing means 48 is rigidly positioned on the uppermost end of the vertical linkage 42, and the tubular horizontal linkage 40 extends through the bearing means 48 for allowing the horizontal linkage 40 to move into and out of the workpiece engagement position relative to the vertical linkage 42.

A trolley support means, generally indicated at 50, is included for supporting the motion transmitting means 22 and providing guided linear movement to the motion transmitting means 22 in the longitudinal direction. More specifically, the trolley support means 50 comprises a plurality of roller elements 52 disposed about a fixed guide member 54. The guide member 54 preferably comprises an elongated rail 54 having a constant rectangular cross section. As perhaps best shown in FIGS. 2 and 3, the trolley support means 50 comprises at least four roller elements 52 disposed against each of the wide faces of the rectangular guide member 54, and at least two roller elements 52 disposed against each of the narrow faces of the rectangular guide member 54. The roller elements are attached to the trolley support means 50 by threaded fasteners having grease fitting receiving ends for conveniently lubricating the roller elements 52. In other words, the roller elements 52 are disposed about the guide member 54 in tight abutting engagement, such that, as viewed from FIG. 2, four roller elements 52 are disposed on each of the wide vertical faces of the guide member 54, and two roller elements 52 are disposed against each of the narrow horizontal faces of the guide member 54.

In operation, the trolley support means 50 allow the motion transmitting means 22 and the attached jaw 18 to move longitudinally relative to the stations for indexing the workpieces W to their respective next die stations. Indexing means, not shown, drive the motion transmitting means 22 and attached jaw 18 longitudinally along the trolley support means 50. The indexing means may comprise any suitable apparatus, such as mechanical, electric servo, pneumatic, or hydraulic indexing mechanisms.

Figure 3:
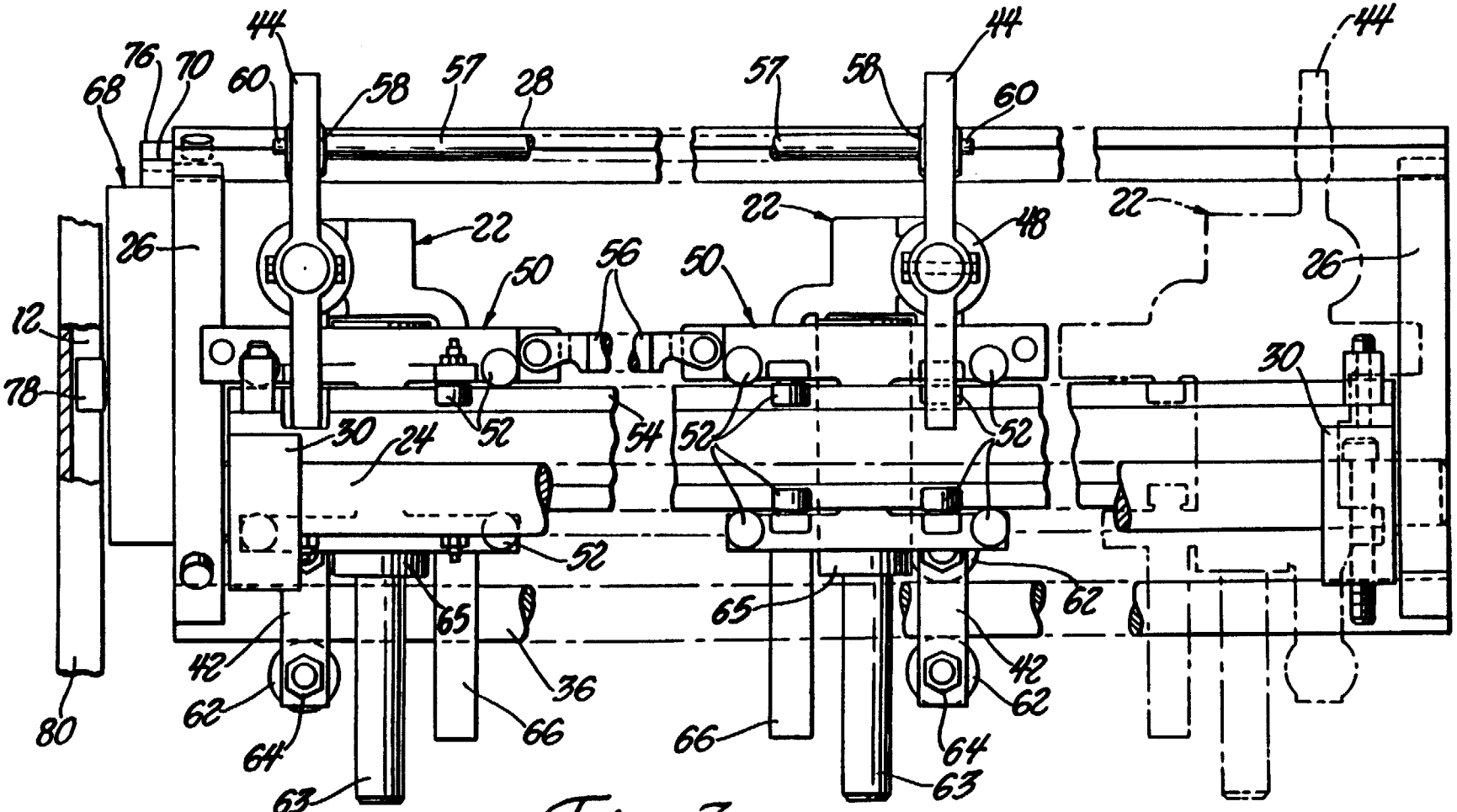
FIG. 3 is a rear view of the subject invention.

As shown in FIGS. 1 and 3, it is frequently desirable to interconnect two motion transmitting means 22 on each flank of the press for use in tandem during the workpiece W transfer operation. Therefore, in the preferred embodiment, the transfer assembly 10 includes a coupling means 56 for connecting one of the motion transmitting means 22 to another like motion transmitting means 22, and for allowing the two to operate in tandem during the workpiece W transferring operation. As perhaps best shown in FIG. 3, the coupling means 56 attached between the trolley support means 50 of the tandemly operating motion transmitting means 22. The length of the coupling means 56 is determined by the physical characteristics of the particular punch press machine employed. As will be appreciated, the jaw 18 also serves to interconnect two tandemly operating motion transmitting means 22. In addition, a bar, or rod-like member 57, may extend between two tandemly operating motion transmitting means 22, as shown in FIG. 3. The rod 57 is fixed to the plates 44, thus increasing the coupled stability. Mounting surfaces 58 are provided on each of the plates 44 for mounting the connecting rod 57 as previously described. Bolts 60 may be extended through apertures in the mounting surfaces 58 for threading into the ends of the rod 57 and securely holding them in place, as shown in FIG. 2.

As best shown in FIGS. 2 and 3, the vertical linkage 42 includes a second crank bar retaining means 62 for transferring vertical movement from the second crank bar 36 to the vertical linkage 42. More specifically, the second crank bar retaining means 62 comprises at least one roller element 62 disposed on each side of the second crank bar 36 for allowing unrestricted longitudinal movement of the vertical linkage 42 along the second crank bar 36. Said another way, the roller elements 62 are positioned in tight abutting engagement against opposing surfaces of the second crank bar 36. The rollers 62 are orientated to roll along the crank bar 36, however, will transmit movement positively to the vertical linkage 42 in response from oscillation of the second crank bar 36. The roller elements 62 of the second crank bar retaining means 62 are attached to the lowermost end of the vertical linkage 42 by bolts 64 extending through the vertical linkage 42, as shown in FIG. 3. The bolts 64 include grease fitting receiving ends for allowing convenient lubrication of the rollers 62. In this manner, the rollers 62 can also be easily removed for service.

In the preferred embodiment, best illustrated in FIG. 3, the vertical linkage 42 includes a tubular vertical guide shaft 63 attached adjacent thereto and moveable therewith. The vertical guide shaft 63 extends through a vertically oriented linear guide bearing 65. The guide bearing 65 is affixed to the trolley support means 50, and provides guided vertical motion to the motion transmitting means 22 via the vertical guide shaft 63.

As perhaps best shown in FIG. 2, the first 28 and second 36 crank bars are arcuate in cross section over at least the portions thereof contacting the motion transmitting means 22. That is to say, the first crank bar 36 has a constant cross section along the length thereof, with at least a portion of that cross section being circular. Therefore, as the first crank bar 28 forces the slot 46 into and out of the workpiece engagement position, the arcuate surface of the first crank bar 28 rolls, or slides, against the inner surface of the slot 46. Thus, the first crank bar 28 smoothly moves the horizontal linkage 40 back and forth. Likewise, the second crank bar 36 has a constant cross section along the length thereof, with at least a portion of that cross section being circular. The rollers 62 of the second crank bar retaining means 62 engage the second crank bar 36 at the arcuate cross sectional portions. Accordingly, as the second crank bar 36 is oscillated by the press ram, the second crank bar retaining means rollers 62 smoothly slide across the arcuate surfaces or the second crank bar 36. As will be appreciated, the first 28 and second 36 crank bars may have fully circular cross sections along the lengths thereof, and the partial circular cross sections serve only to reduce material costs and weight.

The transfer assembly 10 includes assist means 66 for providing pressurized air to aid in overcoming a portion of the force required to move the motion transmitting means 22 vertically. More specifically, the assist means 66 comprises a vertically orientated pneumatic piston acting against the weight of the motion transmitting means 22, for overcoming, or counter balancing, a significant portion of the force required by the ram when driving the second cam follower means 20 to raise the motion transmitting means 22. In FIG. 3, the pneumatic assist means 66 are shown adjacent the vertical guide shafts 63, extending parallel thereof, for acting upwardly against the motion transmitting means 22. Pneumatic assist means 66 are well known to those skilled in the art, therefore a complete description of such will not be presently addressed.

The first 16 and second 20 cam follower means include safety clutch means, generally indicated at 68, for disengaging the motion transmitting means 22 from actuation in response to a predetermined level of resistance encountered by the jaw 18. The safety clutch means 68 are disposed adjacent at least one rocker arm 26, 34 of each the first 16 and second 20 cam follower means. The safety clutch means 68 include a driving arm 69 coextending adjacent the respective rocker arms 26, 34. A slide member 70 is slideably disposed in each driving arm 69. The slide member 70 has an arcuate seat portion 72 spring biased into engagement with the rocker arms 26, 34. More specifically, a spring 74 disposed in the driving arm 69 urges each slide member 70 against a pin 76 extending outwardly from each of the rocker arms 26, 34.

If a workpiece W jam or obstruction is encountered during the transfer cycle, the jaw 18 will be prohibited from following through its predetermined motion. When this occurs, the safety clutch means 68 will disengage the first 12 and second 14 cams from the first 16 and second 20 cam follower means. More specifically, the driving arms 69 are driven to oscillate about the first 24 and second 32 rock shafts, which in turn drive the first 26 and second 34 rocker arms via the connection between the arcuate seat portion 72 of the slide member 70 and the pin 76 of the rocker arms 26, 34. When an obstruction is encountered, the pins 76 extending from the rocker arms 26, 34 with roll out of the arcuate seat portions 72. At this, the driving arms 69 continue to oscillate as they are driven by the cams 12, 14, however, the first 16 and/or second 20 cam follower means remain stationary. For a more complete description of the specific elements and operation of the safety clutch means 68, reference may be made to prior art U.S. Pat. Nos. 4,198,845 and 4,513,602.

As shown in FIG. 2, a limit switch 77 is attached to each safety clutch means 68 adjacent the slide member 70 for signaling when a pin 76 extending from a rocker arm 26, 34 has rolled out of the arcuate seat portion 72 of a slide member 70, i.e., during workpiece jam or obstruction conditions.

The driving arms 69 adjacent the first 26 and second 34 rocker arms each include a cam engaging element 78 disposed thereon for tracing the predetermined motion imparted by the first 12 and second 14 cams. The cam engaging elements 78 preferably embody a pin, roller. In this manner, the cams 12, 14 drive each of the safety clutch means 68, which in turn drive each of their respective first 16 and second 20 cam following means.

The first 12 and second 14 cams are of the linear plate type, having a curvilinear slot disposed in each, for reciprocation in a planar path. Therefore, the cam engaging elements 78 are disposed in the curvilinear slots of the first 12 and second 14 cams so that during reciprocation by the press ram, the cam engaging elements 78 are displaced within the curvilinear slots thereby ultimately driving the first 16 and second 20 cam follower means in an oscillatory motion about their respective rock shafts 24, 32. In the preferred embodiment, both of the curvilinear slots of the first 12 and second 14 cams are disposed within an integral carrier plate 80. The carrier plate 80 is attached adjacent the press reciprocating member, or ram. As described previously, the close proximity of the parallel extending rock shafts 24, 32 facilitate the use of an integral carrier plate 80 housing both the first 12 and second 14 cams, thus allowing the cams 12, 14 to comprise a compact configuration. In FIG. 1, the curvilinear slots of the first 12 and second 14 cams are shown extending completely through the carrier plate 80 merely for convenience. In practice, however, it is found safest to only partially extend the curvilinear slots 12, 14 into the carrier plate 80, as shown in partial cross section in FIG. 3.

OPERATION OF THE PREFERRED EMBODIMENT

In practice, it is found most desirable to provide the transfer assemblies 10 on each flank of the press, so that the workpieces W are engaged from both sides. As shown in FIG. 1, opposing sets of transfer assemblies 10 flank each side of the workpieces W. To those skilled in the art, it will be appreciated that the opposing sets of transfer assemblies 10 are generally [minor] *mirror* images of each other.

Turning now to FIG. 2, when the press ram is in the fully closed position, i.e., engaging the workpieces W in the die stations, the transfer assembly 10 is in the position shown in solid lines. As the ram begins its ascent, away from the workpieces W, the curvilinear slot in the first cam 12 urges the cam engaging elements 78 on the first cam follower means 16 to rotate about the first rock shaft 24, thus moving the horizontal linkage 40 with the attached jaw 18 into, or toward, the workpieces W. The jaw 18 moves toward a workpiece engagement position, shown in phantom at 100. A plurality of fingers 82, each corresponding to a workpiece in a die station, are mounted on the jaw 18 and engage the workpieces W when in the workpiece engagement position 100.

Before the press ram reaches the top of its ascent, and after the first cam follower means 16 has moved the jaw 18 into the workpiece engagement position 100, the curvilinear slot in the second cam 14 urges the second cam follower means 20 to rotate about the second rock shaft 32, thus driving the motion transmitting means 22 and the attached jaw 18 above the surface of the dies, as shown in phantom at 200. It will be appreciated that during the workpiece W lifting operation, the lost motion provided in the slot 46 is imparted to the first cam follower means 16 while it means in the workpiece engagement position. At the workpiece lifted position 200, the indexing means moves the motion transmitting means 22 along with the jaw 18 and the workpieces W, longitudinally along the dies a predetermined distance. The predetermined distance, of course, being equal to the distance between die stations.

During the indexing operation, the press ram has reached its maximum height, and has just begun its descent. As the ram descends, the cam engaging element 78 of the second cam follower means 20 begins to retrace the curvilinear slot in the second cam 14, thereby urging the motion transmitting means 22 to lower the workpieces W into their new die stations. At this, the transfer assembly 10 returns to the workpiece engagement position 100, and places the workpieces W into their new die stations. The first cam 12 then urges the jaw 18 to retract from the workpiece engagement position 100, thus returning the transfer assembly 10 to the solid line position shown in FIG. 2. At this, the press ram has almost closed down upon the workpieces W in their new die stations. The indexing means next retract the motion transmitting means 22 back to the starting position so that the fingers 82 on the jaw 18 will be in the corresponding position of their original die stations. Thus, one complete cycle of the transfer assembly 10 has been described. It will be understood, that each complete transfer cycle is performed with every full cycle of the press ram.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A workpiece transfer assembly (10) for a press of the type including a reciprocating member and a series of *longitudinally spaced* in-line stations wherein each station is a further progression of the workpiece (W) forming process, said assembly (10) comprising: a first cam (12) and a second cam (14) for actuation by the reciprocating member; a first cam follower means (16) actuated by said first cam (12) for driving a workpiece engaging jaw (18) in a horizontal direction laterally of the stations into and out of a workpiece engagement position; a second cam follower means (20) actuated by said second cam (14) for raising and lowering said jaw (18) in a vertical direction relative to the stations; [said assembly (10) characterized by including] *said first cam follower means (16) including a first rock shaft (24), a pair of first rocker arms (26) longitudinally spaced from each other and each oscillatory about said first rock shaft (24), and a first crank bar (28) extending longitudinally parallel to said first rock shaft (24) and carried by said pair of first rocker arms (26); said second cam follower means (20) including a second rock shaft (32), a pair of second rocker arms (34) longitudinally spaced from each other and each oscillatory about said second rock shaft (32), and a second crank bar (36) extending longitudinally and parallel to said second rock shaft (32) and carried by said pair of second rocker arms (34); and* motion transmitting means (22) disposed between said jaw (18) and said first (16) and second (20) cam follower means *and operatively interconnecting said first and second crank bars (28, 36)* for providing positive motion transmission to said jaw (18) for horizontal movement into and out of engagement with the workpieces (W) and for providing lost motion transmission in the vertical direction to allow said jaw (18) to be raised and lowered relative to the stations while said first cam follower means (16) remains in the workpiece engagement position.

2. An assembly (10) as set forth in claim 1 characterized by said motion transmitting means (22) including a plate (44) having a vertically elongated slot (46) disposed therein for transmitting positive horizontal motion in response to force applied horizontally to said slot (46) from said first cam (12) follower means (16) and providing lost vertical motion within said slot (46) to said first cam follower means (16) in response to force applied vertically from said second cam follower means (20).

[3. An assembly (10) as set forth in claim 2 further characterized by said first cam follower means (16) comprising: a first rock shaft (24), at least one rocker arm (26) oscillatory about said first rock shaft (24), and a first crank bar (28) disposed on the distil end of said rocker arm (26) in engagement with said motion transmitting means (22).]

[4. An assembly (10) as set forth in claim 3 further characterized by said second cam follower means (20) comprising: a second rock shaft (32), at least one rocker arm (34) oscillatory about said second rock shaft (32), and a second crank bar (36) disposed on the distil end of said rocker arm (34) for engaging said motion transmitting means (22).]

5. An assembly (10) as set forth in claim [4] *2* further characterized by said first rock shaft (24) and said second rock shaft (32) extending in a parallel longitudinal direction relative to the stations.

6. An assembly (10) as set forth in claim 5 further characterized by said motion transmitting means (22) including a horizontal linkage (40) extending between said jaw (18) and said first crank bar (28) for transferring horizontal motion to said jaw (18) from said first cam follower means (16).

7. An assembly (10) as set forth in claim 6 further characterized by said motion transmitting means (22) including a vertical linkage (42) extending between said second crank bar (36) and said horizontal linkage (40) for transferring vertical motion to said jaw (18) from said second cam follower means (20).

8. An assembly (10) as set forth in claim 7 further characterized by said motion transmitting means (22) including a bearing means (48) interconnecting said horizontal linkage (40) and said vertical linkage (42) for allowing said horizontal linkage (40) to be moved relative to said vertical linkage (42).

9. An assembly (10) as set forth in claim 8 further characterized by said bearing means (48) comprising a linear type bearing (48) fixedly disposed on said vertical linkage (42) with said horizontal linkage (40) extending therethrough for providing unrestricted horizontal motion to said horizontal linkage (40).

10. An assembly (10) as set forth in claim 8 further characterized by including trolley support means (50) for supporting said motion transmitting means (22) and allowing unrestricted linear movement of said motion transmitting means (22) in the longitudinal direction.

11. An assembly (10) as set forth in claim 10 further characterized by said trolley support means (50) comprising a plurality of roller elements (52) disposed about a fixed guide member (54).

12. An assembly (10) as set forth in claim 11 further characterized by said guide member (54) comprising an elongated rail (54) having a constant rectangular cross section.

13. An assembly (10) as set forth in claim 12 further characterized by said trolley support means roller elements (52) comprising at least four of said roller elements (52) disposed against each of the wide faces of said rectangular guide member (54) and at least two of said roller elements (52) disposed against each of the narrow faces of said rectangular guide member (54).

14. An assembly (10) as set forth in claim 10 further characterized by including coupling means (56) for connecting one of said motion transmitting means (22) to another like motion transmitting means (22) and for allowing the two to operate in tandem during the workpiece (W) transferring operation.

15. An assembly (10) as set forth in claim 12 further characterized by said vertical linkage (42) including a second crank bar retaining means (62) for transferring vertical movement from said second crank bar (36) to said vertical linkage (42).

16. An assembly (10) as set forth in claim 15 further characterized by said second crank bar retaining means (62) comprising at least one roller element (62) disposed on each side of said second crank bar (36) for allowing unrestricted longitudinal movement of said vertical linkage (42) along said second crank bar (36).

17. An assembly (10) as set forth in claim 16 further characterized by said first (28) and second (36) crank bars being arcuate in cross-section over at least the portions thereof contacting said motion transmitting means (22).

18. An assembly (10) as set forth in claim 17 further characterized by said assembly (10) including assist means (66) for providing pressurized air to aid in overcoming a portion of the force required to move said motion transmitting means (22) vertically.

19. An assembly (10) as set forth in claim 15 further characterized by said first (16) and said second (20) cam follower means including safety clutch means (68) for disengaging said motion transmitting means (22) from actuation in response to a predetermined level of resistance encountered by said jaw (18).

20. An assembly (10) as set forth in claim 19 further characterized by said safety clutch means (68) comprising a driving arm (69) coextending adjacent each of said rocker arms (26, 34) including a slide member (70) having a seat portion (72) spring biased into engagement with said rocker arms (26, 34) disposed in said driving arms (69).

21. An assembly (10) as set forth in claim 20 further characterized by said driving arms (69) adjacent said first (26) and second (34) rocker arms each including a cam engaging element (78) disposed thereon for tracing the predetermined motion impaired by said first (12) and second (14) cams.

22. An assembly (10) as set forth in claim 21 further characterized by said first (12) and second (14) cams being of the linear plate type having a curvilinear slot (12, 14) disposed in each for reciprocation in a planar path.

23. An assembly (10) as set forth in claim 22 further characterized by both of said curvilinear slots (12, 14) of said first (12) and second (14) cams being disposed within an integral carrier plate (80).

24. An assembly (10) as set forth in claim 23 further characterized by said carrier plate (80) being attached adjacent the press reciprocating member.

25. A workpiece transfer assembly (10) for a press of the type including a reciprocating member and a series of in-line stations wherein each station is a further progression of the workpiece (W) forming process, said assembly (10) comprising: a first cam (12) of the linear plate type and a second cam (14) of the linear plate type for actuation by the reciprocating member; a first crank bar (28) driven to oscillate about a first rock shaft (24) by said first cam (12) for driving a workpiece engaging jaw (18) in a horizontal direction into and out of a workpiece (W) engagement position; a second crank bar (36) driven to oscillate about a second rock shaft (32) by said second cam (14) for raising and lowering said jaw (18) in a vertical direction relative to the stations, said first (24) and second (32) rock shafts extending in a parallel longitudinal direction relative to the stations; a horizontal linkage (40) extending between said first crank bar (28) and said jaw (18); a vertical linkage (42) extending between said second crank bar (36) and said horizontal linkage (40) including a linear bearing (48) interconnecting said vertical linkage (42) and said horizontal linkage (40); said assembly (10) characterized by said horizontal linkage (40) including a plate (44) disposed thereon having a vertically elongated slot (46) disposed therein through which said first crank bar (28) extends.

* * * * *